DENNEY & CHALFANT.
Horse Rake.
No. 83,937. Patented Nov. 10, 1868.
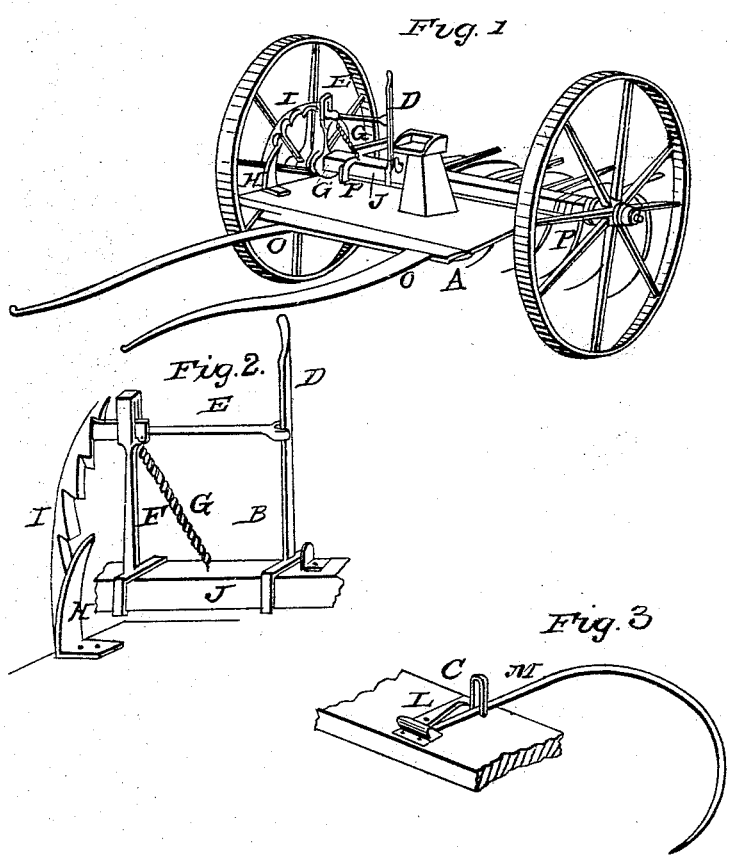

UNITED STATES PATENT OFFICE.

SAMUEL L. DENNEY, OF CHRISTIANA, AND JOHN N. CHALFANT, OF CHESTER COUNTY, PENNSYLVANIA.

IMPROVEMENT IN HORSE-RAKES.

Specification forming part of Letters Patent No. 83,937, dated November 10, 1868.

*To all whom it may concern:*

Be it known that we, SAMUEL L. DENNEY, of Christiana, in the county of Lancaster and State of Pennsylvania, and JOHN N. CHALFANT, of the county of Chester and State above named, have invented certain new and useful Improvements in Self-Unloading Horse-Rakes; and we do hereby declare that the following is a full, clear, and exact description thereof, reference being had to the accompanying drawings, and to the letters of reference marked thereon, which form a part of this specification, in which—

Figure 1 is a perspective view with the improvements in place. Fig. 2 shows the unloading device detached. Fig. 3 shows the tooth with combined guard, guide, and pressure device.

The object of this invention is to transfer the labor of unloading the rake from the driver to the horse.

To enable others skilled in the art to avail themselves of the benefit of our invention, we will now describe its construction.

To the axle J is pivoted the lever D. Connected to lever D is rod E, the end of which works through a slot formed in the end of arm F, which is fastened to the axle J. G is a spiral spring, one end being secured to the axle and the other to the rod E. I is a serrated circular rim, which is secured to the rake-wheel. The serrations or teeth are formed of a hooked shape. The end of the rod I, which takes hold of the same, is of a corresponding shape. H is a stand secured to the platform of the rake, which is of a gradually-curved shape, and in its proper position nearly corresponds with the circle of the rim.

The axle J is rounded at two points and embraced by the hangers P P, which are secured to the thills O O, thereby suspending them underneath the axle. This allows the axle to which the rake-teeth are secured to oscillate sufficiently to unload, and also to allow the teeth to accommodate themselves to the unevenness of the ground.

From this description it will be perceived that when it is desired to unload the rake of the hay or other accumulated material, it is only necessary for the driver to move the lever D toward the rim I. This movement forces the rod E in the same direction. The end of rod D, where it plays in the slot, has a slight shoulder formed on its under side. The action of the spring causes this shoulder, when the lever is pressed toward the rim, to catch on the outer corner of the slot. This holds the rod and lever so that the spring cannot disengage the rod from the notch in the rim I.

By this arrangement the driver has only to press the lever slightly, and need not keep his hand to it to insure certainty in unloading, but has free use of both hands to guide the horse.

The notches on the rim I incline forward rather in a hook form. The end of the rod E which engages or enters the notches is of a corresponding shape, so that when it enters into gear it cannot be unshipped by drawing the lever back, but will require to be forced upward, or in the direction of the length of the slot.

It will be perceived that by the forward motion of the wheel, when put into gear, the arm F will be carried forward, bringing the rod E in contact, near to its outer end, with the stand H, causing it to slide out from the direction of the center of the wheel, which unships and allows the teeth to drop back to the ground. The action of the spring, from its inclined position, draws the rod back and also to the lower end of the slot in which it works. The functions of the spring are merely to set the rod back to the position when not in gear, and is not intended to be so rigid as to tend to unship the rake before the end of the rod E is forced clear of the notch. By this form of the notches, and being disengaged in this way, the out corners of the same are pressed square and the surfaces perfect, thereby overcoming the difficulty which has existed in other devices where the rod is drawn directly back. The notches become more rounding, so that they fail to hold or remain in gear until the teeth are sufficiently elevated to pass clear of the windrow. The value and importance of this toothed rim over those heretofore in use will be readily understood and appreciated.

C is a device for holding the tooth in place, while it is allowed independence to rise and fall a short distance, and also is adapted to applying the necessary pressure to the teeth to press them to the ground when necessary.

The guard L is provided with a longitudinal groove, running at a right angle with its length, and terminating at a right angle. The tooth is bent to fit this groove, and, being placed on the same, is then secured to the rake head or axle. That portion which extends forward terminates in the form of a yoke or staple to straddle the tooth. This serves for a guide to keep the tooth in its relative position. By extending this device forward, or in the direction of the curve of the tooth, it is made to act as a pressure-bearer on the tooth. The inner surface of this yoke or guide is flat and of such a width that it does not have the injurious effect of wearing a notch in, and thereby weakening, the tooth, as is the case with the staple-guide.

This combined device possesses the advantage of holding the tooth to its place, allowing it to have an independent movement, guiding it in its up-and-down motion, and acting as a pressure-bearer on the tooth, and can be either cast or formed from sheet metal, as may be desired.

Having thus described our invention, what we claim as new, and desire to secure by Letters Patent, is—

1. The lever D, rod E, arm F, spring G, and curved stand H, when arranged to operate in the manner and for the purpose described.

2. The combination of the serrated rim I, rod E, lever D, arm F, spring G, and curved stand H, when operating in the manner and for the purpose set forth.

3. The combined tooth-guard, guide, and pressure-bearer, when constructed as herein shown and described.

In testimony that we claim the foregoing as our own we affix our signatures in presence of two witnesses.

S. L. DENNEY.
JOHN N. CHALFANT.

Witnesses:
SAML. R. PARKE,
A. W. TURNER.